United States Patent
Veach

(10) Patent No.: US 7,178,840 B1
(45) Date of Patent: Feb. 20, 2007

(54) DOME CLAMP FOR TANKER TRUCKS

(76) Inventor: Douglas W. Veach, 64 W. "Q" St., Springfield, OR (US) 97477

( * ) Notice: Subject to any disclaimer, the term of this patent is extended or adjusted under 35 U.S.C. 154(b) by 122 days.

(21) Appl. No.: 11/010,111

(22) Filed: Dec. 10, 2004

(51) Int. Cl.
 *E05B 65/00* (2006.01)
(52) U.S. Cl. .............................. 292/256.5; 292/259 R; 292/292
(58) Field of Classification Search ............. 292/256.5, 292/259 R, DIG. 11, 129, 116–118, 8, 40, 292/100, 177, 289, 292, 295, 302, 258, DIG. 2; 220/314; 269/201, 228
See application file for complete search history.

(56) References Cited

U.S. PATENT DOCUMENTS

| | | | | |
|---|---|---|---|---|
| 1,768,188 A | * | 6/1930 | Champion, Jr. ............. | 292/256 |
| 2,505,400 A | * | 4/1950 | Hinds ........................ | 292/288 |
| 3,237,463 A | * | 3/1966 | McPherson ................. | 74/106 |
| 3,799,533 A | * | 3/1974 | Malott ....................... | 269/32 |
| 4,961,600 A | * | 10/1990 | Points et al. ................ | 292/25 |
| 5,145,222 A | * | 9/1992 | Meyer ....................... | 292/258 |
| 5,211,433 A | * | 5/1993 | Gumbs ...................... | 292/256 |
| 6,682,109 B2 | * | 1/2004 | Horne et al. ................ | 292/22 |
| 2003/0116973 A1 | * | 6/2003 | Liu ........................... | 292/26 |

* cited by examiner

*Primary Examiner*—Brian E. Glessner
*Assistant Examiner*—Kristina R Gluchowski
(74) *Attorney, Agent, or Firm*—Robert E. Howard

(57) ABSTRACT

A dome clamp for retaining the dome lid of a tanker truck in a closed position. The dome clamp includes an upper tube, right and left clamp members, and a vertically adjustable locking means adapted to be movable from an unextended position out of contact with a dome lid to an extended position in contact with a dome lid. Each of the right and left clamp members have downwardly extending legs having claw members extending inwardly from a lower portion thereof, and arms extending inwardly from an upper portion thereof. The arms are positioned within the upper tube, and are attached to spring means for urging the right and left arms towards each other in an unloaded condition. The spring means allows the right and/or left arms to be moved away from each other in a loaded condition.

4 Claims, 3 Drawing Sheets

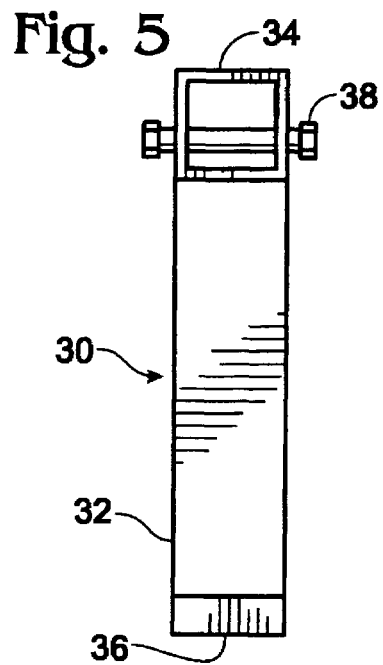
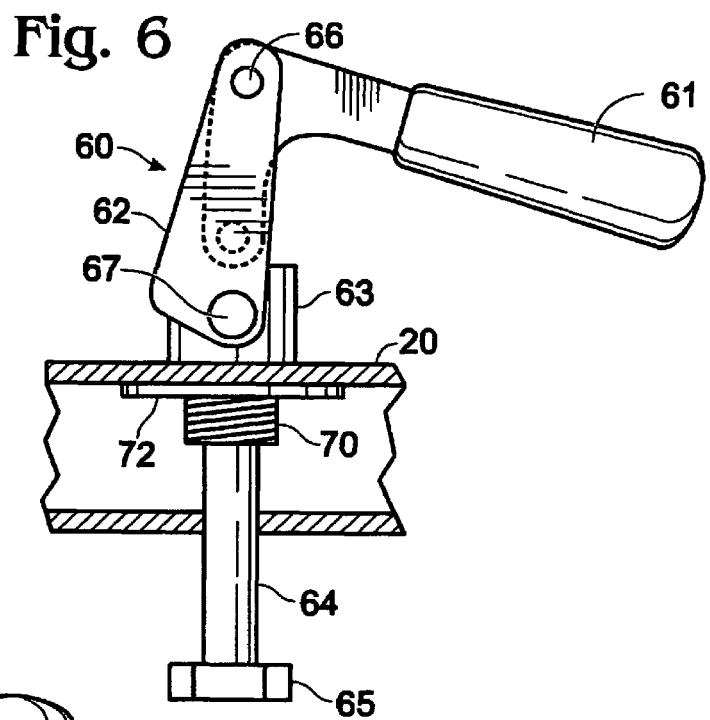
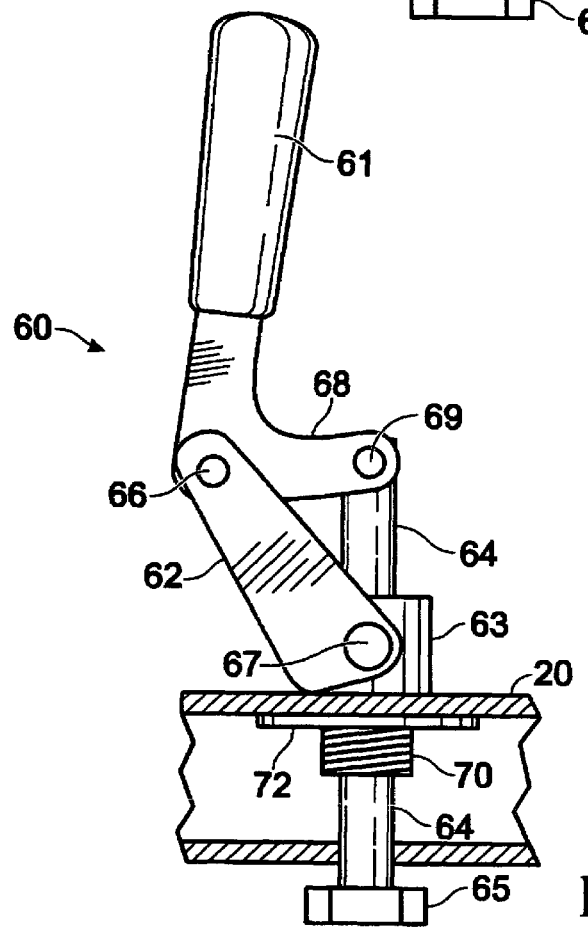

DOME CLAMP FOR TANKER TRUCKS

BACKGROUND OF THE INVENTION

The present invention relates to a dome clamp that can be used to clamp down the dome lids on tanker trucks, such as those designated MC 306 and DOT 406.

Tanker trucks are used to carry large volumes of liquids. Such trucks have an annular dome that covers the filling opening in the tank and normally extends above the tank. The annular dome typically has a circumferential rim. The tank is sealed by a dome lid positioned within the annular dome.

Many liquids carried by tanker trucks are hazardous chemicals. If the tanker truck is involved in an accident and rolls over, there is a danger of leakage from the dome lid.

U.S. Pat. No. 4,961,600 describes a tank cover clamp that can be used to hold down the dome lid of a tanker truck to prevent leakage. However, the foot of the clamp can only engage the dome lid where it is located in the center of the annular dome. In many tanker trucks the dome lid is not in the middle of the annular dome.

SUMMARY OF THE INVENTION

It is an object of the invention to provide a dome clamp that can be used to clamp down the dome lid of a tanker truck regardless of whether the dome lid is in the center of the annular dome or offset from the center thereof.

The dome clamp of the present invention includes an upper tube, right and left clamp members, and a vertically adjustable locking means adapted to be movable from an unextended position out of contact with a dome lid to an extended position in contact with a dome lid. Preferably, the locking means is a double acting plunger lock.

The right and left clamp members have downwardly extending right and left legs, respectively, right and left claw members extending inwardly from a lower portion of the right and left legs, respectively, and right and left arms extending inwardly from an upper portion of the right and left legs, respectively. The claw members are adapted to clamp onto the rim of the annular dome of a tanker truck.

The right and left arms are positioned within the right and left portions of the upper tube, respectively, and are attached to means for urging the right and left arms towards each other in an unloaded condition so that each of said arms is substantially wholly positioned within said upper tube. Preferably, the means for urging the arms towards each other is a spring means. The spring means allows the right and/or left arms to be moved away from each other in a loaded condition.

BRIEF DESCRIPTION OF THE DRAWINGS

FIG. 5 is an end elevational view of one of the clamp members;

FIG. 6 is an enlarged front elevational view, partially in cross section, of the attachment of the double acting plunger lock to the outer tube, the plunger lock being shown in its fully extended position; and FIG. 7 is an enlarged front elevational view of the double acting plunger lock shown in its fully retracted position.

DESCRIPTION OF PREFERRED EMBODIMENTS

Figure 1:
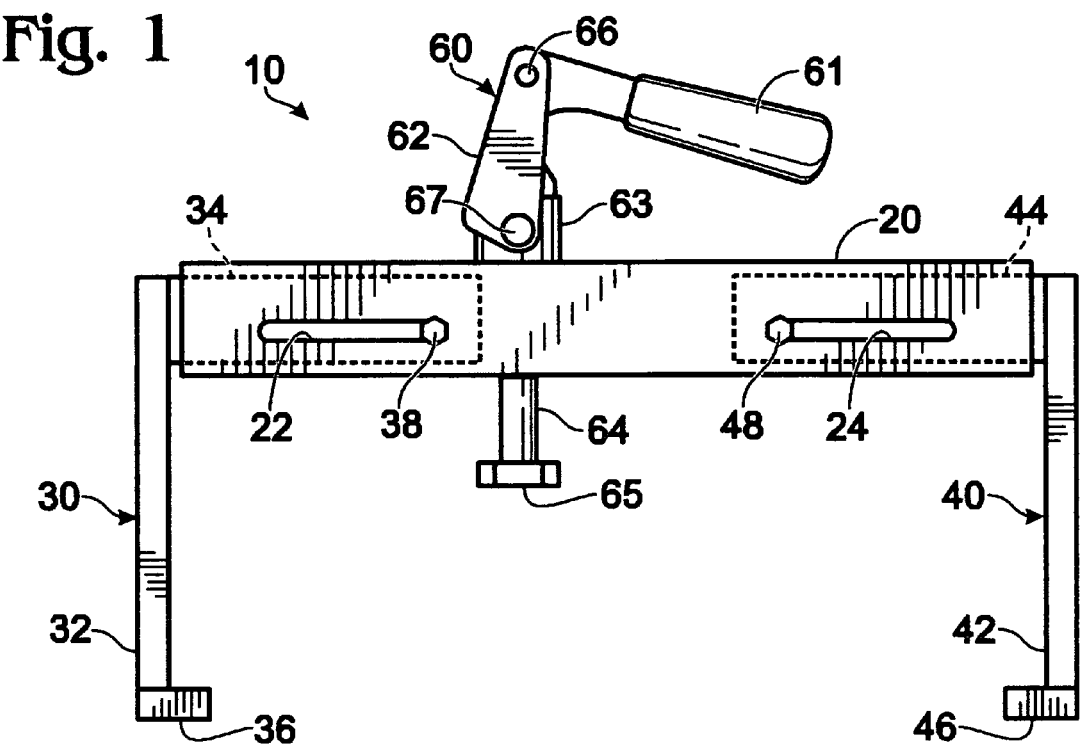
FIG. 1 is a front elevational view, partially in cross-section, of the dome clamp of the present invention.

The dome clamp 10 of the present invention includes a horizontal upper tube 20, identical right and left clamp members 30 and 40, respectively, and a double acting plunger lock 60.

Upper tube 20 is preferably an aluminum tube, and preferably has a square cross section. Upper tube 20 has right, left, and center portions, and has opposing side walls and opposing top and bottom walls. Although it is not intended to limit the dome clamp 10 to any particular dimensions, preferred dimensions will be discussed. Outer tube 20 is preferably 2 inches by 2 inches, with a wall thickness of 0.25 inch. Right and left stop pin slots 22 and 24 are formed in the opposing side walls of outer tube 20

Right clamp member 30 has a vertical leg 32, a horizontal arm 34, and an inwardly extending claw 36. Leg 32 is preferably an aluminum bar stock, and is preferably 0.5 inch by 1.0 inch in cross section. Arm 34 is preferably an aluminum tube that is square in cross section, has inner and outer ends, and has opposing side walls and opposing top and bottom walls. Arm 34 is preferably 1.5 inches by 1.5 inches in cross section, and has a wall thickness of 0.188 inch. Claw 36 preferably has a width of about 1.25 inches.

A stop pin 38 extends between the opposing side walls of arm 34, as best seen in FIG. 5. However, stop pin 38 could extend between the opposing top and bottom walls of arm 34.

Left clamp member 40 is identical in construction to right clamp member 30, and has a vertical leg 42, a horizontal arm 44, and an inwardly extending claw 46.

A stop pin 48 extends between the opposing side walls of arm 44. However, stop pin 48 could extend between the opposing top and bottom walls of arm 44.

Figure 2:
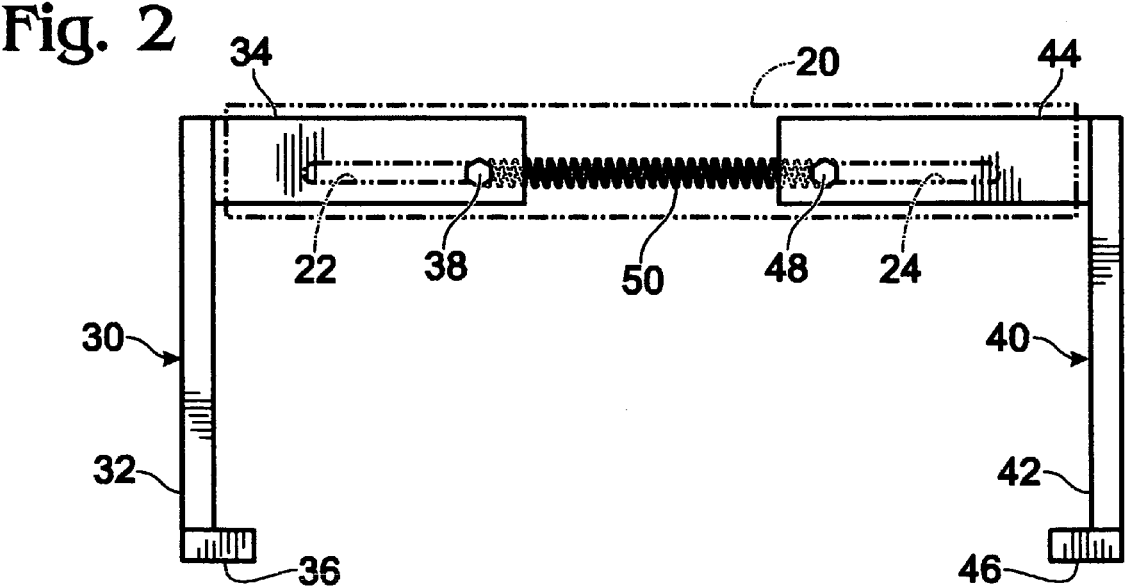
FIG. 2 is a front elevational view of the arms of the dome clamp showing spring means extending therebetween and attached thereto, with the upper tube being shown in phantom.
Figure 3:
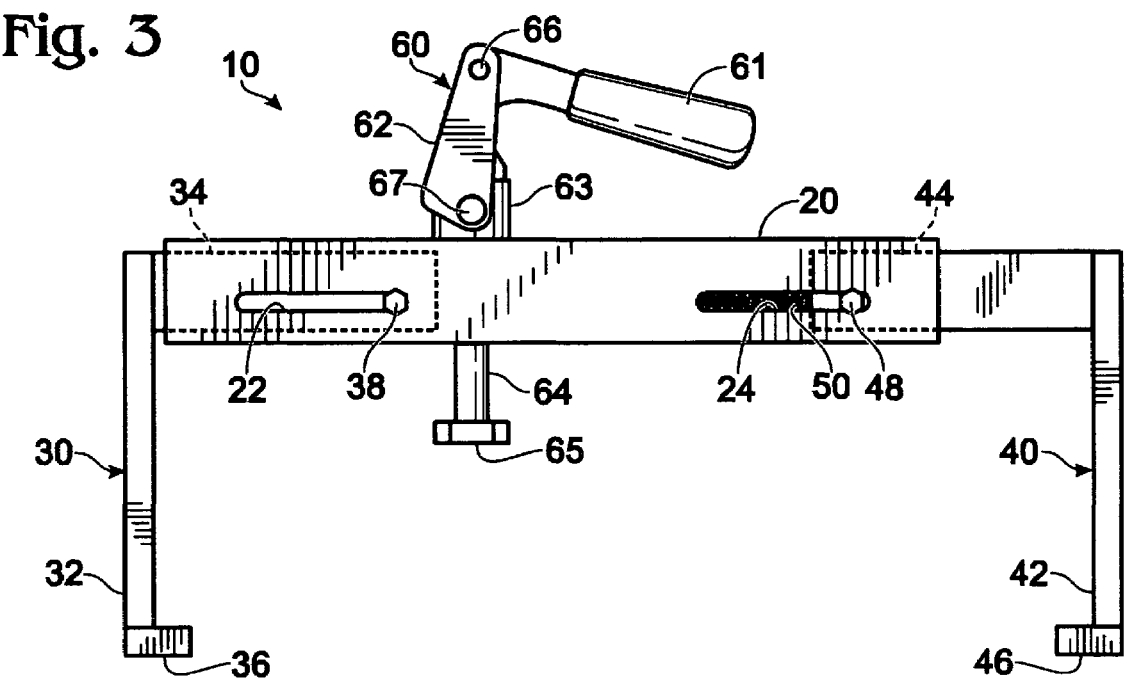
FIG. 3 is a front elevational view of the dome clamp showing the left clamp member extended outwardly.
Figure 4:
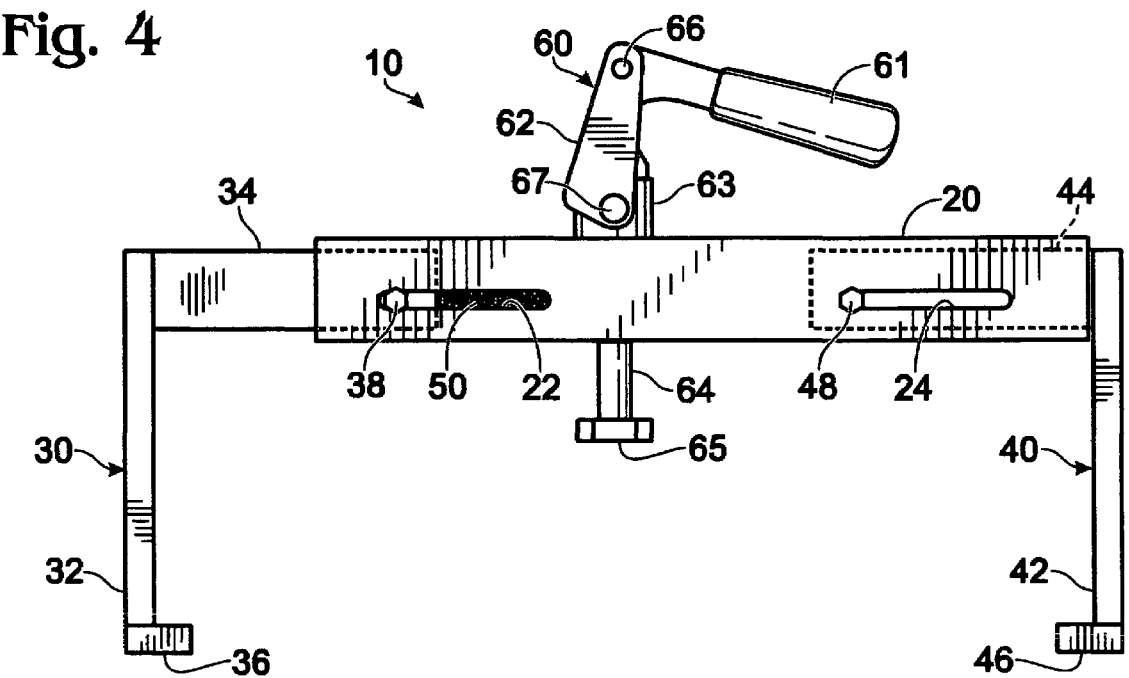
FIG. 4 is a front elevational view of the dome clamp showing the right clamp member extended outwardly.

Right and left arms 34 and 44 are positioned substantially wholly within right and left portions of upper tube 20, and are retained in the retracted position shown in FIGS. 1 and 2 by a spring member 50 extending therebetween and attached at its right and left ends to right and left stop pins 38 and 48, respectively. In this configuration the spring member 50 is in its "unloaded" condition. When the left or right clamp members are extended away from upper tube 20, as shown in FIGS. 3 and 4, respectively, the spring member 50 is in its "loaded" condition.

A double acting plunger lock 60 includes a handle 61, pivot arm 62, plunger guide 63, plunger rod 64, and plunger foot 65. Pivot arm 62 is pivotally attached at its upper end to an extension of handle 61 by pivot pin 66 and pivotally attached at its lower end to plunger guide 63 by pivot pin 67. The upper end of plunger rod 64 is pivotally attached to a pivot arm 68 of handle 61 by pivot pin 69. Double acting plunger lock 60 is commercially available from the De-Sta-Co Corporation, and is described in U.S. Pat. No. 3,237,463, the entire contents of which are hereby incorporated by reference.

Double acting plunger lock 60 is attached to upper tube 20 by passing plunger rod 64 through upper and lower openings in the upper and lower walls of upper tube 20, as best seen in FIG. 6. A threaded extension 70 of plunger guide 63 passes through an opening in the upper wall of upper tube 20, and a lock nut 72 threaded onto the threaded extension 70 and tightened.

Double acting plunger lock 60 is positioned adjacent the inner end of right horizontal arm 34 of right clamp member 30, although it could be positioned adjacent the inner end of left horizontal arm 44 of left clamp member 40. The reason for positioning double acting plunger lock 60 off-center is to enable the dome clamp 10 to be operable whether the dome lid of a tanker truck is positioned in the center of the tank opening or off-center, as will be discussed below.

Although the double acting plunger lock 60 just described is the preferred means of holding a dome lid in place to prevent leakage, other locking means could be used. Such locking means could be cam actuated plungers, a vertically adjustable screw with a handle for adjusting the screw upwards and downwards (screwjack), etc.

In operation, dome clamp 10 is positioned over the dome lid of a tanker truck with the handle 61 of the double acting plunger lock 60 in its fully retracted position shown in FIG. 7. Claws 36 and 46 of right and left clamp members 30 and 40 are positioned under the circumferential rim of the annular dome by adjusting right and/or left horizontal arms 34 and 44 outwardly. Where the dome lid is in the center of the annular dome, right arm 34 would be extended outwardly a greater distance than left arm 44, as shown in FIG. 4. Where the dome lid is off-center, the left arm 44 would be extended outwardly a greater distance than right arm 34, as shown in FIG. 3. In either case, once the foot 65 is substantially centered over the dome lid of the tank trailer, and the claws 36 and 46 have fully engaged the circumferential rim of the annular dome, handle 61 of double acting plunger lock 60 is rotated downwardly to extend plunger rod 64 downwardly to the position shown in FIGS. 3 and 4 and thereby bring foot 65 into locking engagement with the dome lid.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A dome clamp for retaining the dome lid of a tanker truck in a closed position comprising:
    an upper tube having right, left, and center portions;
    right and left clamp members, said right and left clamp members having downwardly extending right and left legs, respectively, right and left claw members extending inwardly from a lower portion of said right and left legs, respectively, and right and left arms extending inwardly from an upper portion of said right and left legs, respectively;
    said right and left arms being positioned within the right and left portions of said upper tube, respectively;
    spring means for urging said right and left arms towards each other in an unloaded condition so that each of said arms is substantially wholly positioned within said upper tube, but allowing said right and/or left arms to be moved away from each other to form a loaded condition; and
    a double acting plunger lock having a plunger rod that is vertically adjustable from an unextended position out of contact with the dome lid to an extended position in contact with the dome lid, said double acting plunger lock including a handle pivotally attached to a plunger guide via a pivot arm and pivotally attached to the upper end of said plunger rod, said plunger guide being attached to the top wall of said upper tube, said plunger rod extending through said plunger guide and adapted to move vertically upward and downwards within said guide in response to said handle being moved upwardly or downwardly, said plunger rod having a foot attached to its lower end and adapted to come into contact with the dome lid upon being extended downwards.

2. The dome clamp of claim 1 wherein said plunger guide is attached to said upper tube at a location adjacent to the inner ends of one of said right or left arms of said right and left clamp members.

3. A dome clamp for retaining the dome lid of a tanker truck in a closed position comprising:
    an upper tube having right, left, and center portions;
    right and left clamp members, said right and left clamp members having downwardly extending right and left legs, respectively, right and left claw members extending inwardly from a lower portion of said right and left legs, respectively, and right and left arms extending inwardly from an upper portion of said right and left legs, respectively;
    said right and left arms being positioned within the right and left portions of said upper tube, respectively;
    right and left stop pins extending between opposing walls of said right and left arms, respectively, adjacent their inner ends;
    spring means for urging said right and left arms towards each other in an unloaded condition so that each of said arms is substantially wholly positioned within said upper tube, but allowing said right and/or left arms to be moved away from each other to form a loaded condition, said spring means having right and left ends attached to said right and left stop pins, respectively;
    a double acting plunger lock having a plunger rod that is vertically adjustable from an unextended position out of contact with a dome lid to an extended position in contact with a dome lid.

4. The dome clamp of claim 3 wherein said upper tube has opposing slots in opposing walls in said right and left portions of said tube, and said right and left stop pins extend through said opposing slots in said opposing walls in said right and left portions of said tube, respectively.

* * * * *